United States Patent
Vezil et al.

(10) Patent No.: US 12,268,987 B2
(45) Date of Patent: Apr. 8, 2025

(54) MULTI-MODE AIR DRYING SYSTEM

(71) Applicant: Ingersoll-Rand Industrial U.S., Inc., Davidson, NC (US)

(72) Inventors: Stefano Vezil, Trieste (IT); Paolo Depiero, Tavagnacco (IT); Giovanni Battista Capellari, Fogliano-Redipuglia (IT)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/672,884

(22) Filed: May 23, 2024

(65) Prior Publication Data
US 2024/0307818 A1    Sep. 19, 2024

Related U.S. Application Data

(63) Continuation of application No. 18/203,387, filed on May 30, 2023, now Pat. No. 12,017,181, which is a continuation of application No. 17/851,553, filed on Jun. 28, 2022, now Pat. No. 11,697,093, which is a continuation of application No. 16/731,262, filed on Dec. 31, 2019, now Pat. No. 11,369,920.

(51) Int. Cl.
*B01D 53/26* (2006.01)
*F25B 39/00* (2006.01)

(52) U.S. Cl.
CPC ............ *B01D 53/265* (2013.01); *F25B 39/00* (2013.01)

(58) Field of Classification Search
CPC ... B01D 53/265; B01D 2258/06; F25B 39/00; F25B 48/022
See application file for complete search history.

(56) References Cited

U.S. PATENT DOCUMENTS

| | | |
|---|---|---|
| 6,311,502 B1 | 11/2001 | Trombin et al. |
| 7,181,920 B2 | 2/2007 | Capellari et al. |
| 2004/0154328 A1 | 8/2004 | Holtzapple et al. |
| 2005/0172665 A1 | 8/2005 | Kim et al. |
| 2005/0252226 A1 | 11/2005 | Seefeldt |
| 2006/0266074 A1 | 11/2006 | Groll et al. |
| 2009/0151370 A1 | 6/2009 | Immink et al. |

(Continued)

FOREIGN PATENT DOCUMENTS

| | | |
|---|---|---|
| EP | 1240936 A1 | 9/2002 |
| EP | 1649921 A2 | 4/2006 |

(Continued)

OTHER PUBLICATIONS

Examination Report for European Patent Application No. 20217186.4, dated May 2, 2022.

(Continued)

*Primary Examiner* — Elizabeth J Martin
(74) *Attorney, Agent, or Firm* — Kevin E. West; Advent, LLP

(57) ABSTRACT

A compressed air drying system is provided for removing moisture from compressed air. The dryer operates in two modes in response to the demand for compressed air. In a first mode of operation, a refrigeration compressor runs continuously and the speed of a condenser fan is varied to maintain a constant cooling temperature. In a second mode of operation, the refrigeration compressor runs intermittently between on and off periods. As result, the cooling temperature fluctuates during the second mode of operation.

20 Claims, 2 Drawing Sheets

(56) References Cited

U.S. PATENT DOCUMENTS

| | | |
|---|---|---|
| 2011/0289945 A1 | 12/2011 | Choi et al. |
| 2012/0272673 A1 | 11/2012 | Yokohara et al. |
| 2012/0291984 A1 | 11/2012 | Li et al. |
| 2013/0118195 A1 | 5/2013 | Ikemiya et al. |
| 2013/0291573 A1 | 11/2013 | Favero |
| 2014/0165633 A1 | 6/2014 | De Piero et al. |
| 2015/0176866 A1 | 6/2015 | Takayama et al. |
| 2017/0059220 A1 | 3/2017 | Vaishnav |
| 2017/0074528 A1 | 3/2017 | De Piero et al. |
| 2017/0128879 A1 | 5/2017 | Kooyman et al. |
| 2018/0031281 A1 | 2/2018 | Wintemute et al. |
| 2018/0238603 A1 | 8/2018 | Takami et al. |
| 2020/0040366 A1 | 2/2020 | Zhao et al. |

FOREIGN PATENT DOCUMENTS

| | | | |
|---|---|---|---|
| EP | 1923123 A2 | 5/2008 | |
| FR | 2648055 A1 | 12/1990 | |

OTHER PUBLICATIONS

Extended Search Report for European Patent Application No. 20217186.4, dated May 11, 2021.

MULTI-MODE AIR DRYING SYSTEM

The present application is a continuation under 35 U.S.C. § 120 of U.S. patent application Ser. No. 18/203,387, filed May 30, 2023, and titled "MULTI-MODE AIR DRYING SYSTEM", which is a continuation of U.S. patent application Ser. No. 17/851,553, filed Jun. 28, 2022, and titled "MULTI-MODE AIR DRYING SYSTEM", which is a continuation of U.S. patent application Ser. No. 16/731,262, filed Dec. 31, 2019, and titled "MULTI-MODE AIR DRYING SYSTEM." U.S. patent application Ser. No. 18/203,387, U.S. patent application Ser. No. 17/851,553 and U.S. patent application Ser. No. 16/731,262 are herein incorporated by reference in their entireties.

BACKGROUND

The present inventions relate generally to industrial air dryers for compressed air systems.

Compressed air is commonly used in factories to power pneumatic tools and to blow air onto various surfaces for cleaning, expanding bags, moving parts, etc. Typically, factories have a centralized compressed air system installed that feeds a network of compressed air piping that supplies numerous tools or stations with compressed air. Thus, one or more centralized air compressors may be used to supply an entire factory space with compressed air.

However, it is known that air compressors which draw air from the surrounding atmosphere also introduce moisture into the compressed air from the water vapor naturally contained in atmospheric air. Moisture within compressed air used in factories can cause numerous problems. For example, in the case of power tools that use compressed air as a power source, moisture within the supplied compressed air can cause corrosion of the internal components of the tool. In addition, where compressed air is blown onto surfaces, any moisture within the compressed air will also be blown onto the surface along with the blown air. This can be particularly problematic where it is a requirement that the surface remain dry, such as food packaging operations, and can also be a problem with delicate surfaces that might be damaged by water particles within the compressed air.

Due to the problems associated with moisture within compressed air systems, various types of air drying systems may be used in industrial factories to remove moisture contained within compressed air. While such systems are useful and adequately address the potential problems associated with moisture in compressed air, such systems can be expensive to operate and maintain. Thus, it would be desirable to provide improved air drying systems for industrial factories.

SUMMARY

A drying system is described for removing moisture from compressed air. The system includes a refrigeration system that operates in two modes depending on the compressed air demand. When compressed air demand is high or moderate, the refrigeration compressor runs continuously and the speed of the condenser fan is varied to maintain a constant cooling temperature. When compressed air demand is low, the compressor runs intermittently between on and off periods to save energy.

The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
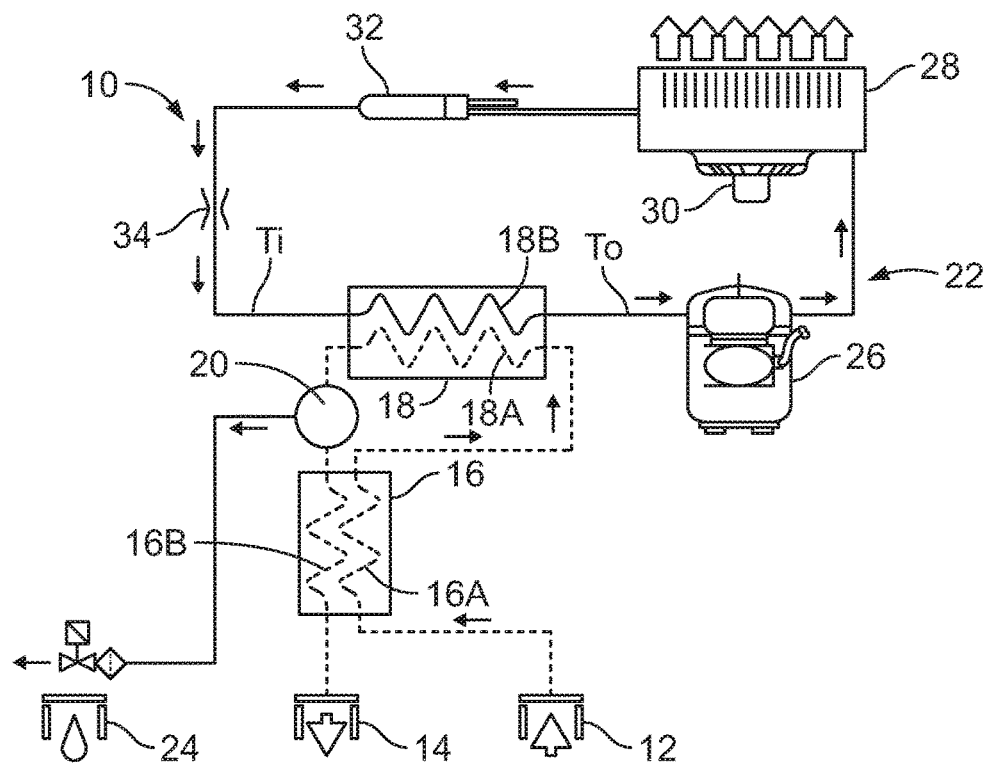
FIG. 1 is a schematic of an air dryer.

Referring now to the figures, and particularly FIG. 1, a schematic for an industrial air dryer 10 for an industrial factory is shown. Although not illustrated, it is understood that the compressed air inlet 12 is connected to a compressed air supply which typically includes one or more air compressors that draw air from the surrounding atmosphere and compresses it to a pressure between 100-200 psi. The compressed air outlet 14 is connected to a network of tools or stations in the factory that use the compressed air for a variety of uses. It may also be desirable for the compressed air system to also have various compressed air storage tanks between the compressor(s) and the air dryer 10 and/or between the air dryer 10 and the tools and/or stations where the compressed air is used. It is further understood that a controller is provided either on the air dryer 10 or located remotely to control the air dryer 10 as described further below.

As shown in FIG. 1, compressed air from the air inlet 12 preferably enters the precooler side 16A of a precooler/preheater 16. The air then exits the precooler/preheater 16 and enters a main cooler 18. After exiting the main cooler 18, the air enters a moisture separator 20. The air then reenters the precooler/preheater 16 on the preheater side 16B, and thereafter, exits the air dryer 10 through the air outlet 14.

The precooler/preheater 16 is a heat exchanger 16 that exchanges heat between the incoming air flow and the outgoing air flow. That is, the incoming air flow is warm relative to the outgoing air flow. As described below, the air is cooled within the dryer 10 to withdraw moisture from the air. Thus, the precooler/preheater 16 increases efficiency by cooling the incoming air with the outgoing air prior to additional cooling that occurs thereafter. Also, it is undesirable for the outgoing air to be too cool since this would cool the compressed air piping and cause condensation of water vapor on the exterior of the piping. Thus, the precooler/preheater 16 prevents this from happening by heating the outgoing air using the warm incoming air.

The main cooler 18 is another heat exchanger 18 that performs the primary cooling of the compressed air. As described further below, the main cooler 18 may use a refrigerant cooling system 22 to cool the compressed air. After the compressed air has been cooled by the main cooler 18 (e.g., to below 5° C.), the moisture separator 20 withdraws moisture from the compressed air. The withdrawn moisture is then removed through a drain 24. Thus, the compressed air entering the preheater side 16B of the precooler/preheater 16 and exiting the dryer 10 has been dried by removing water vapor from the compressed air. It is understood that airflow through the air dryer 10 need not be separately forced or circulated therethrough, but instead may flow through the dryer 10 as air is used by the compressed air demand and replaced by the compressed air supply. That is, any compressed air that flows to the compressed air demand from the compressed air supply must first pass through the dryer 10 (or another dryer in the system) due to the location of the dryer 10 between the supply and demand.

Preferably, the main cooler 18 is cooled with a refrigerant based cooling system 22. Thus, the refrigerant side 18B of the main cooler 18 may be considered to be an evaporator 18B where the refrigerant evaporates and absorbs heat from the compressed air side 18A of the main cooler 18. The refrigerant vapor is then compressed to a higher pressure (and higher temperature) by a refrigerant compressor 26. The refrigerant then passes through a refrigerant condenser 28 that cools and liquefies the refrigerant. The condenser 28 is another heat exchanger 28 with a fan 30 that blows ambient air across the condenser 28 to dissipate heat from the refrigerant. A filter/dryer 32 may be provided thereafter to clean the refrigerant.

An expansion valve 34 then converts the refrigerant back into a vapor for reentry into the refrigerant side 18B of the main cooler 18.

In order to improve efficiency of the dryer 10, two modes of operation are provided depending on the demand for compressed air. That is, when the demand for compressed air is above a threshold (e.g., when a factory is running at full capacity and many air tools are being used), the dryer 10 operates in a first mode of operation. However, when the demand for compressed air is below a threshold (e.g., only partial factory utilization), the dryer 10 shifts into a second mode of operation. The first and second modes of operation are principally distinguished from each other by the operation of the refrigerant compressor 26 and the condenser fan 30 in the two modes. That is, in the first mode, the compressor 26 runs continuously and the speed of the condenser fan 30 is varied to adjust the refrigeration system 22 to the compressed air demand. By contrast, in the second mode, the compressor 26 runs intermittently between on periods 36 when the compressor 26 is running and off periods 38 when the compressor 26 is turned off and not running. Thus, during the on periods 36 when the compressor 26 is running, refrigerant flows through the main cooler 18 like in the first mode. However, during the off periods 38, the refrigerant does not flow through the main cooler 18 since the compressor 26 is not operating. Thus, the compressed air continues to flow through the main cooler 18 during the off periods 38 but the refrigerant is not withdrawing heat from the main cooler 18.

The described method is particularly useful with a fixed speed refrigerant compressor 26, which is relatively inexpensive and reliable but draws a constant amount of power even when the cooling requirement is minimal. It is envisioned that the on and off periods 36, 38 will each be typically between 2 and 30 minutes. Off periods 38 less than 2 minutes would indicate that the cooling requirement is relatively high and less efficiency gains are likely to be achieved with short on and off periods 36, 38. On the other hand, off periods 38 greater than 30 minutes would effectively stop most cooling of the compressed air since the main cooler 18 will typically warm to the temperature of the compressed air in a long off period 38.

Various types of thresholds for controlling the shift between the first and second modes may be used. Various measurements may also be used for determining compressed air demand and controlling the condenser fan 30 in response thereto. In the preferred embodiment, the temperature $T_i$ of the refrigerant at the inlet of the main cooler 18 between the expansion valve 34 and the main cooler 18 may be used both as a control for the condenser fan 30 in the first mode and as a threshold between the first and second modes. For example, in the first mode, the fan 30 may be varied to maintain a constant refrigerant temperature $T_i$ by increasing the fan 30 speed to decrease the refrigerant temperature $T_i$ and decreasing the fan 30 speed to increase the refrigerant temperature $T_i$. The refrigerant temperature $T_i$ may also be used indirectly as a threshold for the first and second modes by shifting to the second mode when the fan 30 speed drops below a set value.

Figure 2:
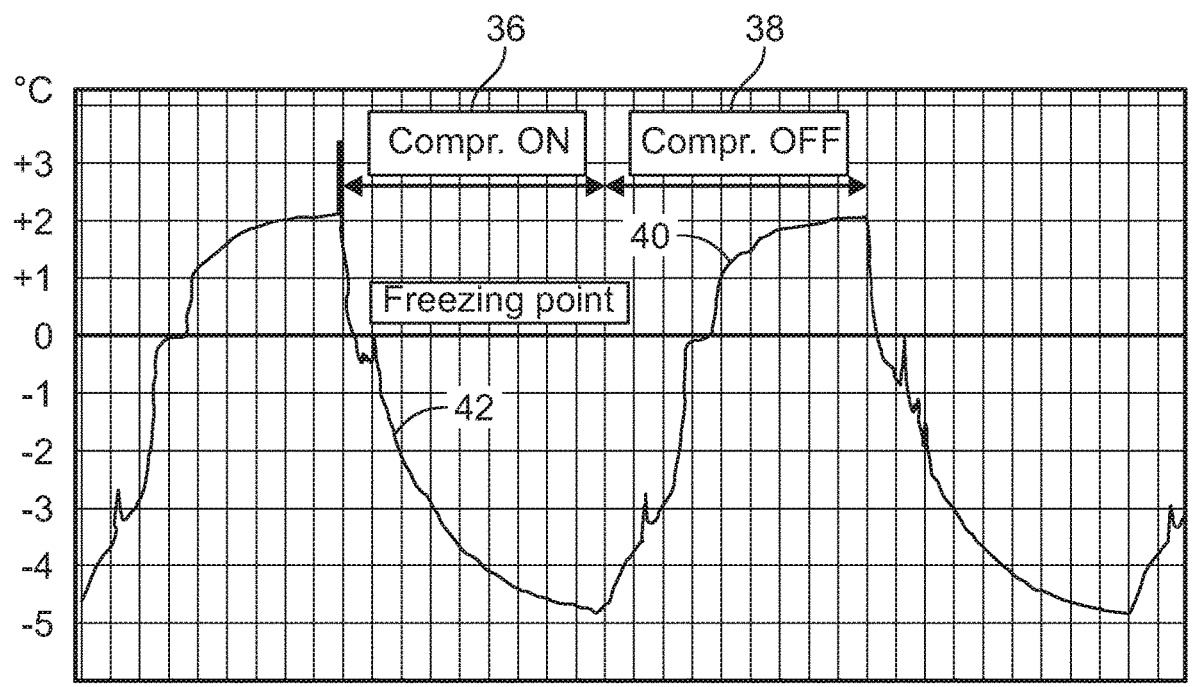
FIG. 2 is a chart of temperature variation during a second mode of operation.

The refrigerant temperature $T_i$ may also be used to determine the on periods 36 and off periods 38 in the second mode. As shown in FIG. 2, the compressor 26 is turned on 36 in the second mode after a temperature of the main cooler 18 (e.g., $T_i$) rises 40 to a set value. The compressor 26 then cools the main cooler 18 while the compressor 26 is running. Once the temperature of the main cooler 18 drops 42 to another set value, the compressor 26 turns off 38. During this time, the compressed air is still flowing through the main cooler 18 and is being cooled by the cold energy stored in the main cooler 18. That is, the main cooler 18 and stagnant refrigerant therein act as a heat sink that stores the cold temperature generated during the on period 36. However, since the refrigerant is not being cooled during the off period 38 and is not flowing through the main cooler 18, the flowing compressed air eventually absorbs the stored cold energy and causes the temperature of the main cooler 18 to rise 40. This intermittent sequence is repeated during the second mode so that the compressor 26 need not be running constantly and energy can be saved during off periods 38.

As shown in FIG. 2, the temperature of the main cooler 18 (e.g., $T_i$) preferably fluctuates below and above the freezing point of water during the second mode. By contrast, the main cooler 18 temperature is preferably held constant during the first mode at a temperature slightly above 0° C. (e.g., 1-6° C.). Normally, it would be undesirable to allow the temperature of the main cooler 18 to drop below the freezing temperature, since this will allow the moisture in the compressed air to freeze and collect within the main cooler 18. However, in the described second mode, allowing a temperature drop below freezing causes the main cooler 18 to act as a heat sink to store cold energy. Thus, frosting that may occur within the main cooler 18 due to moisture in the compressed air acts temporarily as a heat sink but melts and dissipates during the off period 38 as the temperature rises 40 above freezing. In order to improve efficiency in the second mode during the on periods 36, it may be preferable to run the condenser fan 30 at full speed to apply maximum cooling to the main cooler 18. The condenser fan 30 may also be run at a constant speed during the on periods 36 as opposed to a varying speed as in the first mode.

As previously noted, it is also possible to use other values or temperatures to control the fan 30 speed, the shift between the first and second modes, and the on and off periods 36, 38 in the second mode. For instance, a temperature difference may also be used. For example, the temperature $T_o$ of the refrigerant may also be measured at the outlet of the main cooler 18 between the main cooler 18 and the compressor 26. A large temperature difference between $T_i$ and $T_o$ generally indicates that there is a high compressed air demand since a higher level of heat is being absorbed from the refrigerant in the main cooler 18. Thus, the difference between $T_i$ and $T_o$ may be used in varying the fan 30 speed in the first mode, determining when to shift to the second mode, and determining the on and off periods 36, 38.

Figure 3:
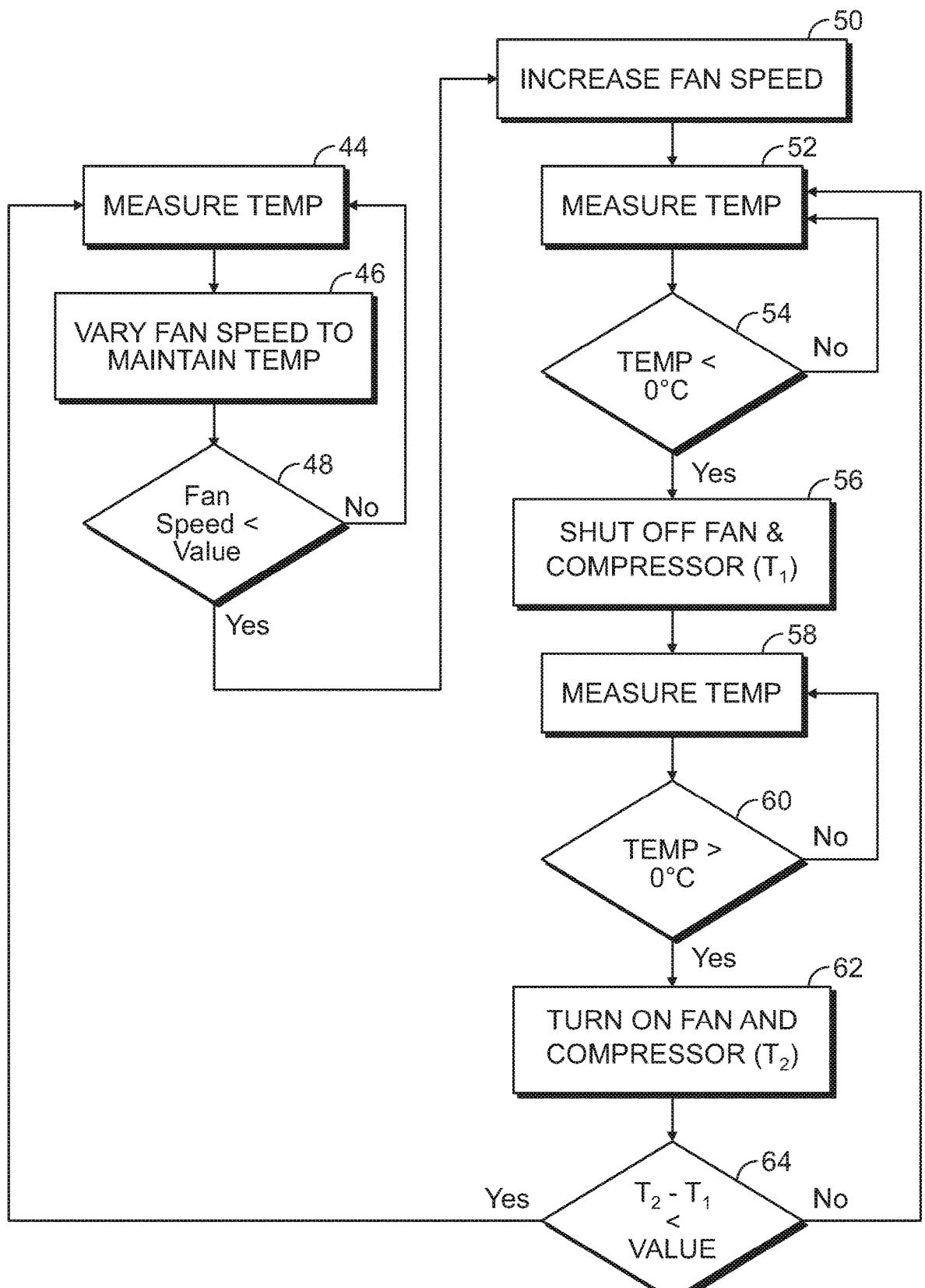
FIG. 3 is a flow chart of a method of operating an air dryer.

Turning to FIG. 3, a flow chart of an embodiment of the invention is illustrated. The flowchart begins with the dryer 10 operating in the first mode by measuring the temperature of the dryer 10 (e.g., $T_t$) (44). The speed of the condenser fan 30 is then varied based on the measured temperature in order to maintain the temperature at a constant level (46). It is desirable to maintain the temperature of the main cooler above 0° C. in the first mode (e.g., 1-6° C.). The speed of the fan 30 is then checked (48), and if the fan 30 speed is above the threshold, the dryer 10 stays in the first mode and continues to vary the condenser fan 30 speed as needed to maintain a constant temperature (44-48). However, if the speed of the fan 30 drops below a threshold, the dryer 10 switches into the second mode of operation. It may be desirable for the fan 30 to drop below a threshold for a set amount of time before the dryer 10 switches into the second mode.

In the second mode of operation, the speed of the fan 30 is preferably set to a constant speed that is an increase over the fan 30 speed before the shift into the second mode (50). For example, the fan 30 speed may be increased to full speed. Typically, the second mode will begin with an on period 36 where the compressor 26 continues to run. The temperature of the main cooler 18 is then measured again (52), and the dryer 10 remains in the on period 36 as long as the temperature remains above a set value (52-54). For example, in FIG. 3, the set value is 0° C. (54). However, as shown in FIG. 2, the set value may be about -5° C. Preferably, the main cooler 18 does not cool to less than -10° C. during the on period 36. When the temperature drops 42 to the set value (preferably at least 0° C.), the compressor 26 is turned off and the fan 30 may also be turned off (56). It may be desirable for the temperature to remain below the set value for a set amount of time before the compressor 26 and fan 30 are turned off. The temperature is then measured again and the dryer 10 remains in the off period 38 as long as the temperature remains below a set value (58-60). For example, in FIG. 3, the set value is 0° C. (60). However, as shown in FIG. 2, the set value may be about 2° C. Preferably, the main cooler 18 does not warm to more than 6° C. during the off period 38. When the temperature rises 40 to the set value (at least 0° C.), the compressor 26 and the fan 30 are turned back on (62). The amount of time of the off period 38 is also determined (64), and if the time of the off period 38 was less than a set value, the dryer 10 then shifts back into the first mode (44). Otherwise, the dryer 10 stays in the second mode (52) where the compressor 26 runs intermittently between on and off periods 36, 38.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method for drying compressed air comprising:
supplying the compressed air to a heat exchanger;
supplying a refrigerant to the heat exchanger;
operating a condenser fan to blow across a refrigerant compressor;
in a first mode, continuously compressing the refrigerant and varying a speed of the condenser fan in response to the demand for the compressed air, and
in a second mode, intermittently compressing the refrigerant between on periods and off periods, the compressed air passing through the heat exchanger without the refrigerant passing through the heat exchanger during the off periods,
wherein in the second mode, the speed of the condenser fan is set to a constant higher speed than the speed of the condenser fan prior to a shift from the first mode to the second mode.

2. The method according to claim 1, further comprising preheating the compressed air before entering the heat exchanger and precooling the compressed air after passing through the heat exchanger.

3. The method according to claim 1, further comprising separating moisture from the compressed air after the compressed air passes through the heat exchanger.

4. The method according to claim 1, further comprising evaporating the refrigerant before entering the heat exchanger.

5. The method according to claim 4, further comprising measuring a first temperature of the refrigerant between an expansion valve and the heat exchanger to determine the on periods and off periods in response to the first temperature.

6. The method according to claim 5, further comprising measuring a second temperature of the refrigerant between the heat exchanger and the refrigerant compressor, and where the on periods and off periods are determined in response to a difference between the first temperature and the second temperature.

7. The method according to claim 1, further comprising cooling the refrigerant below 0° C. during the on periods.

8. The method according to claim 7, further comprising cooling the refrigerant to not less than -10° C. during the on periods and allowing the refrigerant within the heat exchanger to warm to not more than 6° C. during the off periods.

9. The method according to claim 1, further comprising running the refrigerant compressor at a fixed speed.

10. The method according to claim 1, wherein each of the off periods is between 2 and 30 minutes and each of the on periods is between 2 and 30 minutes.

11. A method for drying compressed air comprising:
supplying the compressed air to a heat exchanger;
supplying a refrigerant to the heat exchanger;
operating a condenser fan to blow across a refrigerant compressor;
running the refrigerant compressor in a first mode when a demand for the compressed air is above a threshold and in a second mode when a demand for the compressed air is below the threshold, where:
in the first mode, continuously compressing the refrigerant and varying the speed of the condenser fan in response to the demand for the compressed air, and
in the second mode, intermittently compressing the refrigerant between on periods and off periods, the compressed air passing through the heat exchanger without the refrigerant passing through the heat exchanger during the off periods.

12. The method according to claim 11, further comprising setting the speed of the condenser fan in the second mode to a constant higher speed than the speed of the condenser fan prior to a shift from the first mode to the second mode to maintain a threshold temperature on the one side of the heat exchanger during the off periods.

13. The method according to claim 11, further comprising preheating the compressed air before entering the heat exchanger and precooling the compressed air after passing through the heat exchanger.

14. The method according to claim 11, further comprising separating moisture from the compressed air after the compressed air passes through the heat exchanger.

15. The method according to claim 11, further comprising evaporating the refrigerant before the refrigerant passes through the heat exchanger.

16. The method according to claim 15, further comprising measuring a first temperature of the refrigerant between an expansion valve and the heat exchanger to determine the on periods and off periods in response to the first temperature.

17. The method according to claim 16, further comprising measuring a second temperature of the refrigerant between the heat exchanger and the refrigerant compressor, and where the on periods and off periods are determined in response to a difference between the first temperature and the second temperature.

18. A method for cooling a refrigerant in a compressed air drying system comprising:
   supplying a refrigerant to a heat exchanger,
   compressing the refrigerant in a refrigerant compressor,
   operating a condenser fan refrigerant to blow across the refrigerant compressor;
   operating the refrigerant compressor in a first mode when a demand for compressed air is above a threshold and a second mode when a demand for the compressed air is below the threshold, where:
   in the first mode, varying a speed of the condenser fan in response to the demand for compressed air, and
   in the second mode, intermittently compressing the refrigerant between on periods and off periods, and setting the speed of the condenser fan to a constant higher speed than the speed of the condenser fan prior to a shift from the first mode to the second mode.

19. The method according to claim 18, further comprising intermittently compressing the refrigerant between on periods and off periods, and
   directing the compressed air through the heat exchanger without the refrigerant passing through the heat exchanger during the off periods.

20. The method according to claim 18, further comprising evaporating the refrigerant before the refrigerant passes through the heat exchanger.

* * * * *